(12) United States Patent
Steinhauer et al.

(10) Patent No.: US 10,627,336 B2
(45) Date of Patent: Apr. 21, 2020

(54) OPTICAL MEASUREMENT DEVICE

(71) Applicant: HACH LANGE GMBH, Berlin (DE)

(72) Inventors: Frank Steinhauer, Berlin (DE); Roman Klein, Berlin (DE); Robert Dalljo, Berlin (DE)

(73) Assignee: HACH LANGE GMBH, Berlin (DE)

( * ) Notice: Subject to any disclaimer, the term of this patent is extended or adjusted under 35 U.S.C. 154(b) by 0 days.

(21) Appl. No.: 16/347,989

(22) PCT Filed: Nov. 7, 2017

(86) PCT No.: PCT/EP2017/078426
§ 371 (c)(1),
(2) Date: May 7, 2019

(87) PCT Pub. No.: WO2018/087069
PCT Pub. Date: May 17, 2018

(65) Prior Publication Data
US 2019/0265156 A1    Aug. 29, 2019

(30) Foreign Application Priority Data

Nov. 8, 2016  (DE) .................... 20 2016 106 236 U

(51) Int. Cl.
*G01N 21/00* (2006.01)
*G01N 21/15* (2006.01)
*G01N 21/51* (2006.01)

(52) U.S. Cl.
CPC ............. *G01N 21/15* (2013.01); *G01N 21/51* (2013.01); *G01N 2021/152* (2013.01)

(58) Field of Classification Search
CPC ........... G01N 15/0205; G01N 15/1459; G01N 21/29; G01N 2015/1486; G01N 21/53
(Continued)

(56) References Cited

U.S. PATENT DOCUMENTS 4,165,179 A     8/1979  Sato
2014/0273188 A1*  9/2014  Mohan ............... G01N 21/0303
                                                435/287.2

FOREIGN PATENT DOCUMENTS

EP      1816462 A1    8/2007
JP      S6128021 U    2/1986
(Continued)

OTHER PUBLICATIONS

European Patent Office, International Search Report, dated Jan. 15, 2018, 3 pages.

*Primary Examiner* — Md M Rahman
(74) *Attorney, Agent, or Firm* — Ference & Associates LLC

(57) ABSTRACT

An optical measurement device with a transparent cylindrical measurement cuvette, which defines an axial symmetrical axis and contains the fluid sample, an optical measurement arrangement which quantitatively determines the optical property of the fluid sample in the measurement cuvette, and a mechanical cleaning arrangement is described. The cleaning arrangement comprises an external magnetic working platform, which is arranged coaxially to the symmetrical axis, is slidable in a translatory manner parallel to the symmetrical axis, is rotatable about the symmetrical axis, encloses the cylindrical measurement cuvette externally in an annular manner, and has at least one translatory magnet element and at least one rotary magnet element, and an internal magnetic cleaning unit, which is arranged within the measurement cuvette and is slidable in a translatory manner, has a cleaning body, has at least one translatory magnet element, and has at least one rotary magnet element. The translatory magnet elements as well as the rotary magnet elements of the working platform and the cleaning unit are coupled to one another in a contactless and (Continued)

magnetic manner, respectively. Other aspects are described and claimed.

14 Claims, 1 Drawing Sheet

(58) Field of Classification Search
USPC .......................................................... 356/337
See application file for complete search history.

(56) References Cited

FOREIGN PATENT DOCUMENTS

| | | |
|---|---|---|
| JP | H07243964 A | 9/1995 |
| SU | 1233013 A1 | 5/1986 |

* cited by examiner

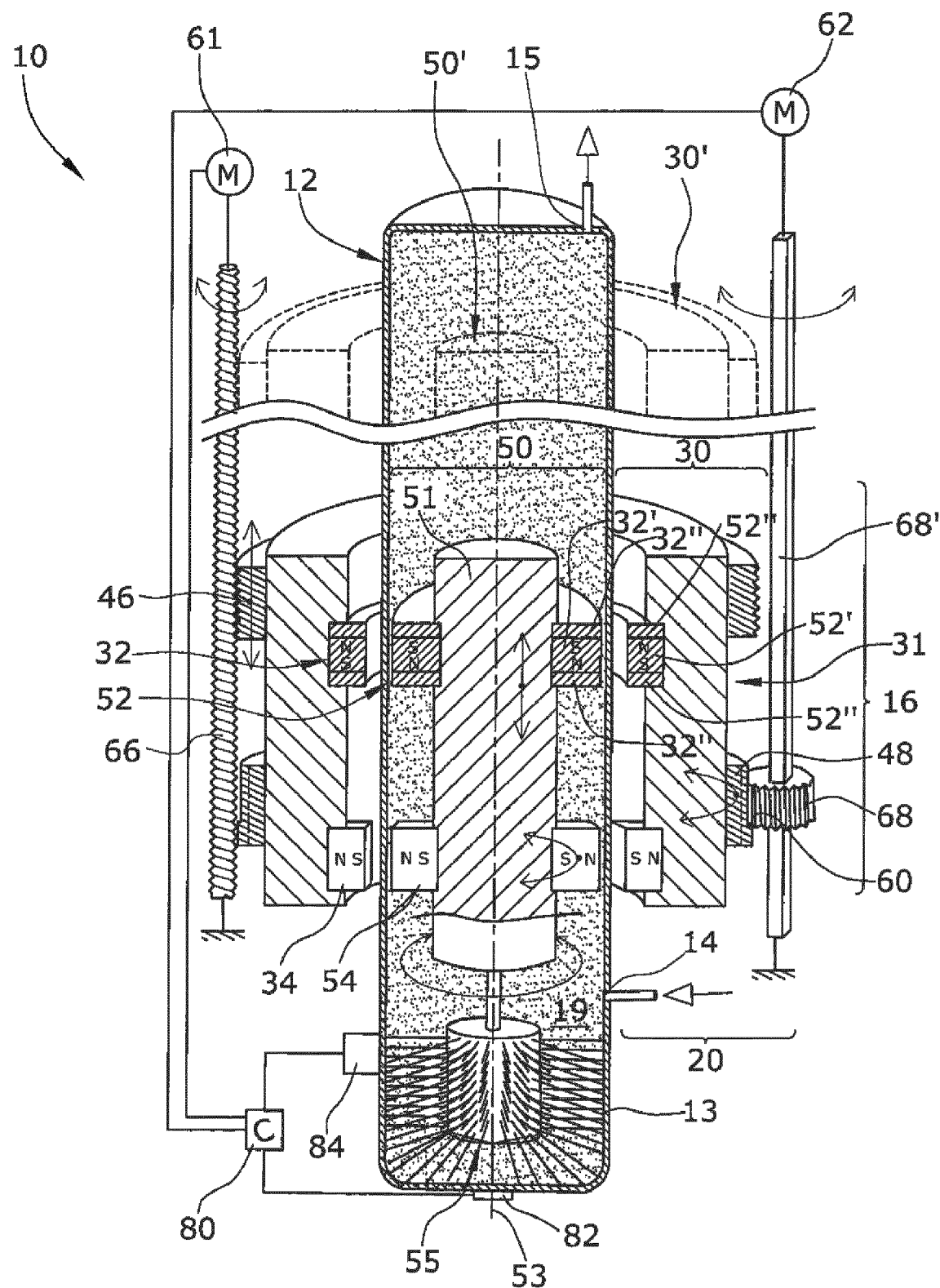

OPTICAL MEASUREMENT DEVICE

The present application is a National Phase Entry of PCT International Application No. PCT/EP2017/078426, which was filed on Nov. 7, 2017, and which claims priority to Application No. 20 2016 106 236.5 filed in Germany on Nov. 8, 2016, the contents of which are hereby incorporated by reference.

The invention relates to an optical measurement device for the quantitative determination of an optical property of a fluid sample in a transparent measurement cuvette.

For this purpose, the measurement device has an optical measurement arrangement, with which the relevant optical property of the fluid sample in the measurement cuvette can be determined. The optical measurement may, for example, be a photometer arrangement or a turbidity measurement arrangement and generally has an optical transmitter and an optical receiver. The optical measurement device determines, for example, the absorption/extinction at a certain wavelength of the turbidity of the fluid sample.

For optical measurement devices, it is important to sustainably ensure the greatest possible ratio of useful signals vs. interfering signals. This is of great importance for the turbidity measurement, in particular, because the useful signal is relatively small as a matter of principle. Therefore, a regular cleaning of the inner surfaces of the measurement cuvette is indispensable. In a process measurement device, which is meant to run for weeks or months without maintenance, this occurs automatically by way of a mechanical cleaning arrangement.

In a process measurement device, a fluid-tight measurement cuvette is preferably used, through which the fluid sample continually flows between a measurement cuvette inlet and outlet. Here, a cleaning of the inner surfaces is only possible with conventional methods if the measurement cuvette is regularly opened in order to be able to clean the inner surfaces of the measurement cuvette with a cleaning unit.

The object of the invention, by contrast, is to create an optical measurement device with a cleaning arrangement that allows a cleaning of the inner surfaces of the measurement cuvette at all times and in a simple manner.

This object is solved by an optical measurement device having the features of claim 1.

The optical measurement device has a transparent cylindrical measurement cuvette, which defines an axial symmetrical axis and contains the fluid sample. In the present case, a measurement cuvette is understood to be a vessel in which the optical measurement occurs and which is therefore necessarily transmissive for the electromagnetic measurement radiation. The optical measurement device has an optical measurement arrangement for the quantitative determination of the optical property of the fluid sample in the measurement cuvette. The optical measurement arrangement is arranged in the transparent region of the measurement cuvette. The optical measurement arrangement is preferably formed by an optical transmitter and an optical receiver. The optical transmitter transmits the measurement radiation, for example light in the visible or non-visible spectrum, with a continuous spectrum or even as monochromatic light. The receiver either directly or indirectly receives the measurement radiation transmitted by the optical transmitter.

The optical measurement device has a mechanical cleaning arrangement with contactless transfer of force for the cleaning of the interior of the measurement cuvette. The cleaning arrangement has an external magnetic working platform and an internal magnetic working cleaning unit, which are force-coupled to one another in a contactless manner.

With respect to the measurement cuvette, the external magnetic working platform is arranged coaxially to the symmetrical axis of the cylindrical measurement cuvette and encloses the measurement cuvette in an annular manner. The measurement cuvette preferably stands vertically, and the external working platform is formed parallel to the symmetrical axis such that it is translatory, i.e. preferably vertically, slidable and rotatable about the coaxial symmetrical axis. The working platform has at least one translatory magnet element and at least one rotary magnet element, wherein the translatory magnet element and the rotary magnet element are preferably separate magnet elements and are especially preferably arranged apart from one another and in translatory orientation to one another. The distance between them is necessary in order to optimize the efficiency of the rotary magnet element and the translatory magnet element.

The corresponding internal cleaning unit is arranged within the measurement cuvette and is slidable and rotatable within the measurement cuvette in a translatory manner. The cleaning unit is neither mechanically fixed in either a translatory or rotary manner nor guided within the narrower sense, but rather force-coupled to the working platform exclusively magnetically in a contactless manner. The movements of the cleaning unit within the measurement cuvette are, however, limited in a radial and translatory manner by the inner walls of the measurement cuvette.

The cleaning unit has a cleaning body, with which the interior of the transparent measurement cuvette is mechanically cleaned. The cleaning body may be, for example, a brush head, with which both the cuvette floor as well as the circular cuvette wall are mechanically cleaned. The cleaning unit has at least one translatory magnet element and at least one rotary magnet element, wherein the cleaning unit magnet elements spatially correspond to and are magnetically coupled to the corresponding working platform magnet elements such that the cleaning unit follows the movement of the working platform in both a translatory as well as a rotary manner. In principle, the magnet elements may be formed ferromagnetically and/or permanent-magnetically. However, at least one magnet element of a magnet element pair, which is composed of one magnet element of the working platform and one magnet element of the cleaning unit, must be formed permanent-magnetically. In this manner, it is ensured that the magnetic coupling is produced sustainably without electromagnetic energy.

Because the transmission of the translatory forces on the one hand and the rotary forces on the other hand preferably occur via distanced, separate magnet elements, a high operational safety is ensured, because in the case of a rotary blockade of the cleaning arrangement, the translatory magnetic coupling remains in effect and the cleaning unit cannot fall down.

Preferably, the working platform is equipped with a rotary drive motor for rotating the working platform and a translatory drive motor for the axial and translatory sliding of the working platform. The two drive motors are preferably arranged statically such that the moving forces are transferred from the drive motors to the working platform via corresponding force transfer mechanics and patterns.

According to a preferred embodiment, the rotary drive motor drives a polygonal rod, which is arranged parallel to the symmetrical axis and, for its part, drives a gearwheel, which drives an annular gear of the working platform. The annular gear is formed in translatory orientation on the polygonal rod in a slidable manner, wherein it is preferably carried by a corresponding carrier of the working platform and kept at the level of the working platform annular gear. In cross section, the polygonal rod can be formed quadratically, for example, wherein the gearwheel has a corresponding centered quadratic opening, such that the gearwheel is carried in a rotary manner by interlocking with the polygonal rod.

Preferably, the translator drive motor drives a threaded rod, which is arranged parallel to the symmetrical axis and drives a threaded ring of the working platform on a transverse plane. The threaded rod may be, in particular, a threaded spindle having an outer thread. The threaded ring of the working platform may have a pitch of zero, but may also have a pitch greater than zero. In the former case, the threaded ring has no real thread but rather ring teeth on a transverse plane, which form an annular gear rack, such that the translatory position of the working platform remains constant during its rotation. In the latter case, the translatory working platform position during the rotation of the working platform must be balanced by a simultaneous complementary compensational rotation of the threaded rod.

Preferably, the optical measurement device is a turbidity measurement device, wherein the optical measurement arrangement is a turbidity measurement arrangement. The optical transmitter is preferably arranged below the cuvette floor, such that the measurement radiation is fed into the measurement cuvette approximately in the symmetrical axis. The optical receiver is preferably arranged laterally to the measurement cuvette and may be formed, for example, as an annular optical receiver, which receives the entire scatter radiation emitted from the measurement cuvette in a radial direction within a circular measurement window.

Preferably, at least one of the two translatory magnet elements of the working platform and the cleaning unit are formed in a closed annular manner. However, it is especially preferable for the two translatory magnet elements, both the translatory magnet element of the working platform as well as that of the cleaning unit, to be formed in a close annular manner, respectively. In so doing, a high translatory force can be sustainably transferred and ensured with relatively cost-effective materials, in particular for the permanent-magnetic magnet element. However, it is especially preferable for both translatory magnet elements to be formed in a closed annular manner as well as energized permanent-magnetically.

Especially preferably, at least one of the two translatory magnet elements is magnetized in the axial or translatory direction.

According to a preferred embodiment, at least two rotary magnet elements are provided on the working platform and/or the cleaning unit, respectively. Especially preferably, four rotary magnet elements are provided on both the working platform and the cleaning unit, respectively. The rotary magnet elements are especially preferably radially permanent-magnetized. By way of a certain minimum number of rotary magnet elements, it is ensured that, in the event of slipping of the magnetic rotary coupling, it can be contained and restored. Especially preferably, the number of rotary magnet elements of the working platform and the cleaning unit, respectively, is even.

In the following, an exemplary embodiment of the invention is described in greater detail with reference to the illustrations.

The illustration shows a schematic view and a longitudinal section view of an optical turbidity measurement device according to the invention.

In the FIGURE, an optical turbidity measurement device 10 is shown, which serves the determination of an optical property, namely the turbidity of a fluid sample 19 in a cylindrical measurements cuvette 12.

The measurement cuvette 12 is formed by a transparent cuvette body 13 made of glass, which is a hollow cylinder and closed or fluid-tight. The fluid sample 19, for example water from the clarification stage of a clarification system, flows through a measurement cuvette inlet 14 arranged in the lower third of the cuvette into the inner chamber of the measurement cuvette 12 and flows out through a measurement cuvette outlet 15 on the upper cuvette end. The fluid sample 19 within the measurement cuvette 12 may be subjected to an overpressure of several bars. The cylindrical measurement cuvette 12 defines an axial symmetrical axis 53.

The measurement device 10 has an optical measurement arrangement for the quantitative determination of the optical property of the fluid sample, in the present case namely the turbidity. The measurement arrangement essentially consists of an optical transmitter 82, which is arranged on the symmetrical axis and below the vertically standing measurement cuvette 12, and an optical receiver 84 arranged laterally outside of the measurement cuvette 12.

The measurement device 10 has a mechanical cleaning arrangement 16 with contactless transfer of force for the cleaning of the interior of the measurement cuvette 12. For this purpose, the cleaning arrangement 16 has an external magnetic and annular working platform 30, which is arranged coaxially to the symmetrical axis 53 and is moved parallel to the symmetrical axis 53 in a translatory manner, and an internal magnetic cleaning unit 50, which is arranged within the measurement cuvette 12.

The working platform 30 lies on a transverse plane and surrounds and encloses the measurement cuvette 12 in an annular manner from the outside. The working platform 30 is arranged and stored both movably in a translatory manner as well as rotatable about the symmetrical axis 53. The working platform 30 has an annular, closed, permanent-magnetic translatory magnet element 32, which is formed as a closed ring and is axially magnetized. The translatory magnet element 32 consists of a centered annular magnet 32', on which a magnetic annular body 32" is placed above and below, respectively. Separately from the translatory magnet element 32, the working platform 30 has four individual rotary magnet elements 34, which are arranged on a transverse plane and are equidistant to one another below the translatory magnet element 32.

The magnet elements 32, 34 are held to the radial interior of a ferromagnetic working platform annular frame 31. The working platform 30 is moved in both a translatory direction and a rotary manner by a corresponding drive pattern 20, which is further described below. Further, the working platform 30 can be surrounded by a housing holding all parts of the working platform 30.

In the interior of the measurement cuvette 12, an internal cleaning unit 50 is arranged, which has a cleaning body 55 in the form of a brush head on its lower end, which is held by a ferromagnetic cleaning unit base body 51. An annular translatory magnet element 52, which is formed permanent-magnetically and magnetized axially, is arranged on the exterior of the base body 51, such that the two translatory magnet elements 52, 32 magnetically attract one another. The translatory magnet element 52 of the cleaning unit 50 also consists of a centered annular magnet 52' between two ferromagnetic annular bodies 52".

Below the translatory magnet element 52, four rotary magnet elements 54 are fixed on the cleaning unit base body 51 and are permanent-magnetically energized in the radial direction and lie on a transverse plane with the corresponding rotary magnet elements 34 of the working platform 30, such that the rotary magnet elements 34, 54 of the working platform 30 on the one hand and of the cleaning unit 50 on the other hand attract one another. The four rotary magnet elements 34, 54 may, considered in the peripheral direction, each be magnetized with alternating polarity, i.e. North-South followed by South-North.

The drive pattern 20 of the measurement device 10 has a rotation drive motor 62, which drives a polygonal rod 68' that is quadratic in cross section and arranged parallel to the symmetrical axis 53. A gearwheel 68 is mounted non-rotatably and slidably in a translatory direction on the polygonal rod 68'. The gearwheel 68 drives an annular gear 48 of the working platform 30 on a transverse plane, which is externally mounted on the working platform annular frame 31. The annular gear 48 has a carrier ring 90 projecting outwards on its lower end, with which the gearwheel 68 is held vertically and carried or pushed such that the gearwheel 68 always remains interlocked with the annular gear 48. In this manner, in any translatory position of the working platform 30, the working platform 30 can turn or rotate upon corresponding operation of the rotation drive motor 62. The translatory guidance of the gearwheel 68 can alternatively be assumed by a working platform housing, not shown, which is movable not rotatable but in a translatory manner and holds or stores all parts of the working platform 30 directly or indirectly.

The drive pattern 20 further has a translatory drive motor 61, which drives a threaded rod 66, which is similarly arranged parallel to the symmetrical axis 53. The threaded rod 66 is equipped with an outer thread of relatively low pitch that is greater than zero. The threaded rod 66 interlocks with a corresponding threaded ring 46 of the working platform 30, which is externally mounted on the cleaning unit base body 51. In the present case, the threaded ring 46 with the thread pitch "zero" has no thread in the narrower sense, but rather has multiple ring teeth whose tooth heads are on a single transverse plan over the entire scope, i.e. in the present case forming an annular gear rack. Upon operation of the translatory drive motor 61, the working platform 30 is moved accordingly in a translatory manner, namely independently of its rotary movement.

The measurement device 10 has a device control unit 80, which controls and regulates the two drive motors 61, 62 as well as the transmitter 82 and the receiver 84 of the optical measurement arrangement.

During the measurement operation, the working platform 30' and the cleaning unit 50' are in an upper resting position, as indicated by the dashed line in the FIGURE. In the resting position, the cleaning body 55 stands above the measurement cuvette inlet 14. In order to clean the inner surfaces in the lower region of the measurement cuvette 12, the translatory drive motor 61 is activated, such that the working platform 30 and the cleaning unit 50, always following the working platform 30, are moved into the translatory cleaning position, as shown in the FIGURE. The rotary drive motor 62 is already activated during the procedure moving downwards, such that the cleaning body 55 mechanically cleans the inner surface of the measurement cuvette 12, namely both the cylindrical wall part as well as the floor wall of the measurement cuvette 12. During the cleaning, no measurement operation occurs.

After completion of the cleaning, the cleaning unit 50 returns to the resting position.

The invention claimed is:

1. An optical measurement device which quantitatively determines an optical property of a fluid sample, comprising:
   a transparent cylindrical measurement cuvette, which defines an axial symmetrical axis and contains the fluid sample,
   an optical measurement arrangement which quantitatively determines the optical property of the fluid sample in the measurement cuvette, and
   a mechanical cleaning arrangement with contactless transfer of force which cleans the interior of the measurement cuvette, wherein the cleaning arrangement comprises:
      an external magnetic working platform, which is arranged coaxially to the symmetrical axis, is slidable in a translatory manner parallel to the symmetrical axis, is rotatable about the symmetrical axis, encloses the cylindrical measurement cuvette externally in an annular manner, and has at least one translatory magnet element and at least one rotary magnet element, and
      an internal magnetic cleaning unit, which is arranged within the measurement cuvette, is rotatable and slidable in a translatory manner, has a cleaning body, has at least one translatory magnet element, and has at least one rotary magnet element,
      wherein the translatory magnet elements as well as the rotary magnet elements of the working platform and the cleaning unit are each coupled to one another in a contactless and magnetic manner, such that the cleaning unit follows the working platform in a translatory and rotary manner.

2. The optical measurement device according to claim 1, wherein the working platform is equipped with a rotary drive motor which rotates the working platform and a translatory drive motor which axially slides the working platform.

3. The optical measurement device according to claim 2, wherein the rotary drive motor drives a polygonal rod, which is arranged parallel to the symmetrical axis and drives a gearwheel, which drives an annular gear of the working platform on a transverse plane.

4. The optical measurement device according to claim 3, wherein the translatory drive motor drives a threaded rod, which is arranged parallel to the symmetrical axis and drives a threaded ring of the working platform on a transverse plane.

5. The optical measurement device according to claim 2, wherein the translatory drive motor drives a threaded rod, which is arranged parallel to the symmetrical axis and drives a threaded ring of the working platform on a transverse plane.

6. The optical measurement device according to claim 1, wherein the optical measurement arrangement is formed by an optical transmitter and an optical receiver, which preferably form a turbidity measurement arrangement.

7. The optical measurement device according to claim 1, wherein at least one of the two translatory magnet elements of the working platform and the cleaning unit is formed in a closed annular manner.

8. The optical measurement device according to claim 7, wherein at least one of the two translatory magnet elements of the working platform and the cleaning unit is magnetized in a translatory direction.

9. The optical measurement device according to claim 7, wherein at least two rotary magnet elements of the working platform and the cleaning unit are magnetized in a radial manner, respectively.

10. The optical measurement device according to claim 7, wherein at least two rotary magnet elements of the working platform or the cleaning unit are magnetized in a radial manner, respectively.

11. The optical measurement device according to claim 1, wherein at least one of the two translatory magnet elements of the working platform and the cleaning unit is magnetized in a translatory direction.

12. The optical measurement device according to claim 1, wherein at least two rotary magnet elements of the working platform and the cleaning unit are magnetized in a radial manner, respectively.

13. The optical measurement device according to claim 1, wherein at least two rotary magnet elements of the working platform or the cleaning unit are magnetized in a radial manner, respectively.

14. The optical measurement device according to claim 1, wherein the measurement device is a process measurement device, the measurement cuvette is fluidically closed and has a measurement cuvette inlet and a measurement cuvette outlet.

* * * * *